United States Patent [19]
Hanson et al.

[11] Patent Number: 5,689,175
[45] Date of Patent: Nov. 18, 1997

[54] VOLTAGE REGULATOR FOR AN ELECTRICAL POWER SYSTEM

[75] Inventors: Michael J. Hanson, Loves Park; Scott R. Myers, Rockford; Frank Joseph Ludicky, Machesney Park; Donald G. Kilroy, Rockford, all of Ill.

[73] Assignee: Sundstrand Corporation, Rockford, Ill.

[21] Appl. No.: 657,919

[22] Filed: May 31, 1996

[51] Int. Cl.$^6$ ............................................. H02J 7/24
[52] U.S. Cl. .................... 322/28; 322/20; 322/29
[58] Field of Search ........................... 322/20, 25, 27, 322/28, 29, 32, 46

[56] References Cited

U.S. PATENT DOCUMENTS

| | | | |
|---|---|---|---|
| 3,743,860 | 7/1973 | Rossell | 307/252 |
| 3,961,235 | 6/1976 | Sauvanet | 232/18 |
| 4,017,801 | 4/1977 | Riedel | 328/35 |
| 4,358,730 | 11/1982 | Beifus | 323/322 |
| 4,449,091 | 5/1984 | Otoi | 323/236 |
| 4,546,424 | 10/1985 | Nolan | 363/87 |
| 4,819,179 | 4/1989 | Klein | 364/484 |
| 4,891,571 | 1/1990 | Wong | 323/322 |
| 5,038,094 | 8/1991 | Rashid | 322/28 |
| 5,285,147 | 2/1994 | Rashid | 322/28 |
| 5,495,163 | 2/1996 | Rozman et al. | 322/10 |
| 5,521,485 | 5/1996 | Vegelsberger | 322/28 |
| 5,550,456 | 8/1996 | Shekhawat et al. | 322/25 |

*Primary Examiner*—Steven L. Stephan
*Assistant Examiner*—Nicholas Ponomarenko
*Attorney, Agent, or Firm*—Antonelli, Terry, Stout & Kraus

[57] ABSTRACT

A digital voltage regulator for an electrical power system including a permanent magnet generator (PMG), an exciter, and a main generator. A controller multiplies the frequency of the generator output voltage by a predetermined value to provide a sampling signal having the multiplied frequency and synchronized with the generator output voltage. The controller also provides a sawtooth voltage signal having a repetition rate equal to the frequency of the sampling signal and an incrementing rate determined by the system clock signal. The generator output voltage is sampled at the frequency of the sampling signal. When the difference between the sampled signal and a reference voltage is greater than the sawtooth voltage, the PMG voltage is switched to provide voltage for the exciter field winding.

16 Claims, 6 Drawing Sheets

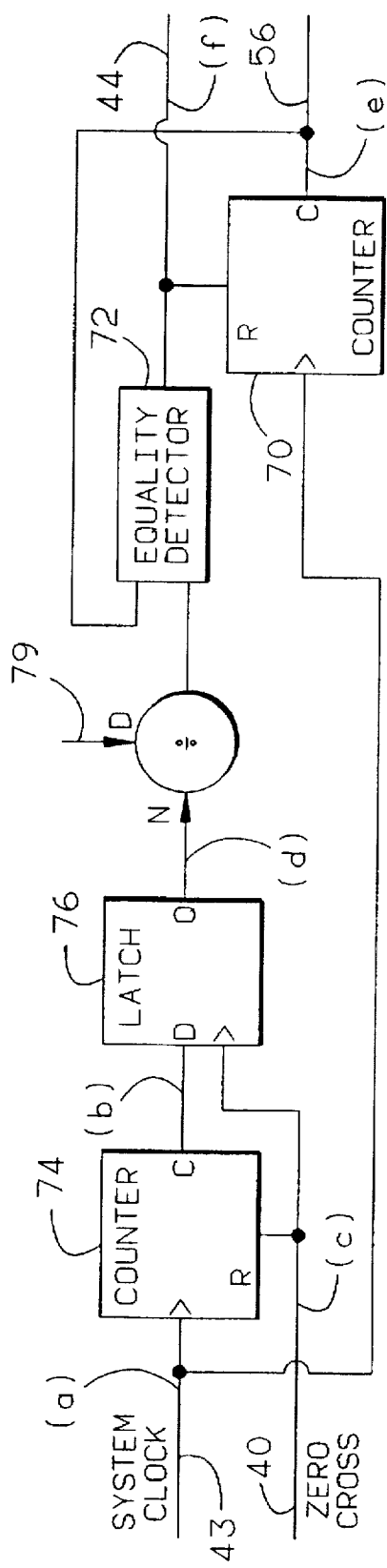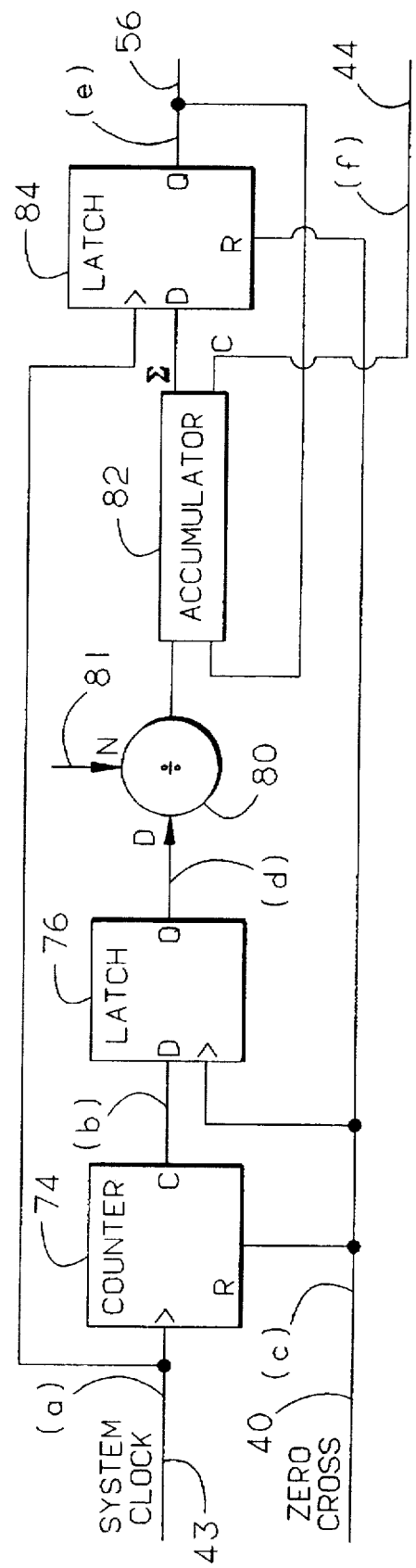

VOLTAGE REGULATOR FOR AN ELECTRICAL POWER SYSTEM

TECHNICAL FIELD

The present invention pertains to a voltage regulator for an electrical power system. More particularly, the present invention pertains to a digital voltage regulator for an electrical power system, such as an auxiliary power unit of the type utilized in aircraft or in other situations requiring auxiliary power. Although the invention will be described with reference to a main power unit of the type utilized on aircraft, applications of the present invention are not restricted to such use.

BACKGROUND ART

When a generator is operated to provide electrical power, the output voltage of the generator must be controlled to assure that it is maintained at the desired voltage level. This is usually accomplished by use of a voltage regulator which monitors the generator output voltage and adjust the generator excitation to maintain the desired output voltage. In a simple form, a voltage regulator can be provided by a high gain amplifier which compares the generator output voltage to a reference voltage and controls the field current of the generator to maintain the generator output voltage at the desired level. Such amplifiers require considerable power. In addition, in environments such as aircraft, it is desirable to minimize the weight of all systems on the aircraft, and so it is desirable to reduce the size and weight of the voltage regulator to the greatest extent possible. Further, aircraft are now being manufactured using composite materials in place of metals, and this reduces the integrity of the electrical system ground. Consequently, a voltage regulator able to operate reliably in such an environment is desirable.

DISCLOSURE OF THE INVENTION

The present invention is a voltage regulator for an electrical power system which is reliable in environments such as those of modern-day aircraft, and which provides accurate control of the voltage output from an electrical generator, while requiring low power and having low weight. The voltage regulator of the present invention operates utilizing digital techniques.

In accordance with the present invention, the AC output from the generator is preprocessed in digital form, for example by means of peak-hold circuits, full wave or half wave rectifier circuits, averaging circuits, or RMS-to-DC circuits, to provide a signal readily usable in software controlled digital circuitry. To process the generator output voltage into digital form requires sampling of the output voltage. If the sampling rate is not a multiple of the frequency of the generator output voltage, then a subfundamental modulation may be observed on the preprocessed output signal due to sampling at different points of the waveform in each cycle of the output voltage. This phenomenon is separate from any aliasing phenomenon. To improve the accuracy of this digital data acquisition, the sampling can be synchronized with the generator output frequency so that the sampling occurs at the same point of the waveform in each cycle of the generator output voltage.

In accordance with the present invention, zero crossings of one phase of the generator output voltage are detected, and the zero crossing frequency, which is equal to the generator output frequency, is utilized to determine the sampling frequency when digitizing the generator output voltage. In addition, the zero crossing frequency is used to determine the repetition rate of a sawtooth wave. The digitized generator output voltage is preprocessed to provide a DC level indicative of, for example, the peak value, the rectified value, the average value, or the RMS value of the generator output voltage, and this preprocessed signal is compared with a reference signal. When the reference signal exceeds the preprocessed signal level by an amount greater than the level of the sawtooth wave form, the exciter voltage to the generator is controlled to increase the generator output voltage.

The sampling pulses for the A/D conversion and the repetition rate of the sawtooth signal might be controlled in any of several manners. In a first embodiment of the present invention this is accomplished by frequency multiplication with a prescaler. In a second embodiment, frequency multiplication with a divider is utilized. In a third embodiment, frequency multiplication with a phase accumulator is utilized.

BRIEF DESCRIPTION OF THE DRAWINGS

These and other aspects and advantages of the present invention are more apparent in the following detailed description and claims, particularly when considered in conjunction with the accompanying drawings, in which like parts of bear like reference numerals. In the drawings:

FIG. 6 is a block diagram of a second embodiment of a controller suitable for use in the voltage regulator of FIG. 2 in accordance with the present invention; and FIG. 7 is a block diagram of a third embodiment of a controller suitable for use in the voltage regulator of FIG. 2 in accordance with the present invention.

BEST MODE FOR CARRYING OUT THE INVENTION

Figure 1:
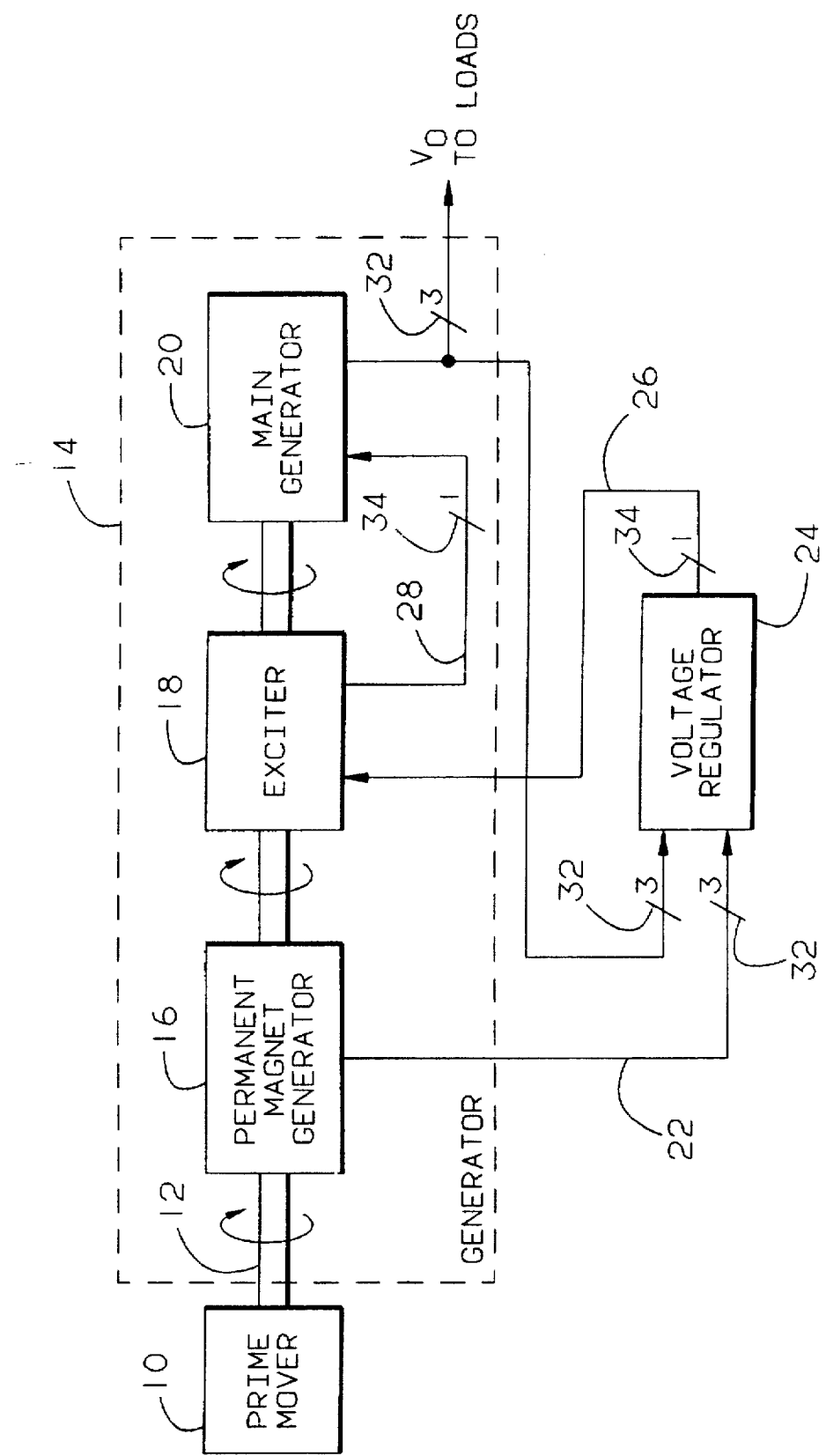
FIG. 1 is a block diagram of a main power unit incorporating a voltage regulator in accordance with the present invention.

FIG. 1 is a simplified block diagram of an auxiliary power unit incorporating a voltage regulator in accordance with the present invention. A prime mover 10, such as gas turbine engine, has an output shaft 12 which rotates to provide rotary power to a generator 14. Within generator 14, shaft 12 causes rotation of components within a permanent magnet generator 16, an exciter 18, and a main generator 20, as is well known. U.S. Pat. No. 5,495,163, the disclosure of which is incorporated herein by reference, shows such an auxiliary power unit in more detail.

Permanent magnet generator 16 includes a permanent magnet, which is rotated by shaft 12, and three sets of phase windings. The three-phase output voltage from the phase windings is applied by line 22 to voltage regulator 24. Exciter 18 has a field winding and three armature windings. The armature windings are rotated by shaft 12. Voltage regulator 24 applies exciter voltage on line 26 to the field winding in exciter 18. Rotation of the exciter armature windings by shaft 12 creates electrical voltage in the exciter armature windings. This voltage is rectified and applied by line 28 to a field winding within main generator 20. Rotation of that field winding by shaft 12 generates three phase voltage in armature windings of main generator 20. Output line 30 from main generator 20 applies the three phase output voltage of generator 14 to loads within the aircraft and to voltage regulator 24.

Figure 2:
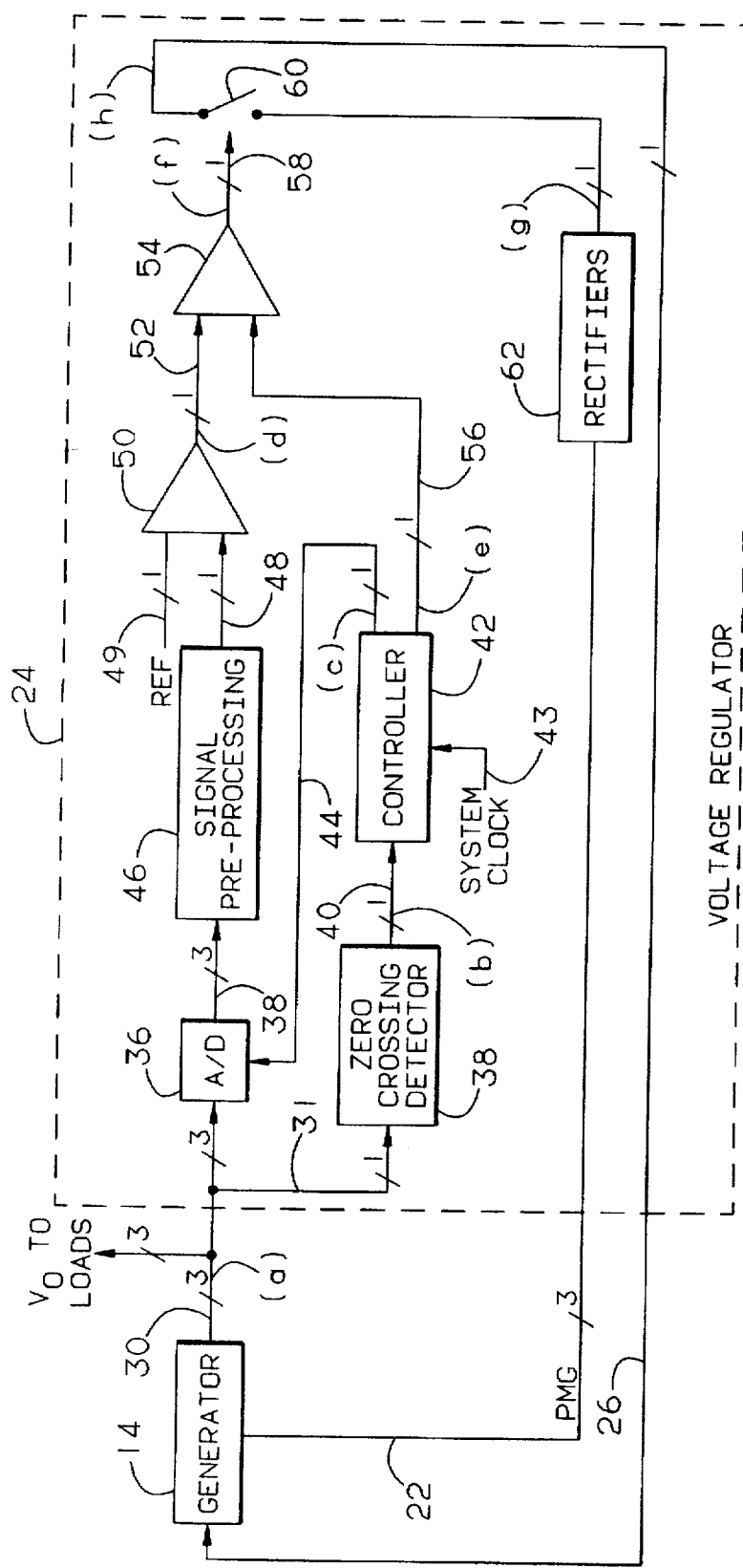
FIG. 2 is a block diagram of a voltage regulator in accordance with the present invention utilized with an electrical generator.

As indicated by indicia 32 in both FIG. 1 and FIG. 2, the permanent magnet generator voltage on line 22 is in fact three phase voltage, as is the output voltage on line 30 from the main generator 20. On the hand, as indicated by indicia 34, a single voltage is applied on line 26 from voltage regulator 24 to exciter 18, and a single voltage is applied on line 28 from exciter 18 to main generator 20. Each single voltage, in fact, requires two conductors, as is well known in the art.

FIG. 2 depicts voltage regulator 24 in block diagram form. The three phase output voltage from generator 14 is applied by line 30 to A/D converter 36. FIG. 3(a) depicts the three phase voltage on line 30 of FIG. 2, as indicated by the character (a) directed line 30 in FIG. 2. A single phase of the three phase voltage from generator 14 is applied by line 31 to zero crossing detector 38. Zero crossing detector 38 provides an output pulse on line 40 to controller 42 in synchronism with the generator 14 output voltage on line 31, as depicted in FIG. 3(b). Thus, if the three phase voltage from generator 14 is 400 Hz voltage, then the zero crossing signal on line 40 is a series of rectangular pulses at a pulse repetition rate or frequency of 400 Hz.

Controller 42 receives a system clock signal from line 43, and produces a series of pulses on its output line 44 at a pulse repetition rate that is an integral multiple of the output frequency of generator 14, as depicted in FIG. 3(c) and described more fully hereinbelow. These output pulses are applied to A/D converter 36 which converts the analog output voltage of generator 30 to a digital format. Output line 38 from A/D converter 36 applies that digital format signal to a signal preprocessing circuit 46 which provides on its output line 48 a processed signal indicative of a representative value of the output voltage from generator 14. This representative value might be the peak value, a full or half wave rectified voltage value, an average value, or an RMS value, for example.

Comparison circuit 50 receives this processed signal voltage on line 48 at its minus input and receives on its plus input a reference voltage from line 49 that indicates the desired output voltage level from generator 14. When the reference voltage on line 49 exceeds the voltage on line 48, comparison circuit provides an output indicative of the difference. FIG. 3(d) illustrates the output of comparison circuit 50, showing first representative output signal 50a, the level of which remains substantially constant, and a second representative output signal 50b, the level of which gradually decreases.

The output of comparison circuit 50 is applied by its output line 52 to the plus input of comparison circuit 54. The minus input of comparison circuit 54 receives as an input a sawtooth waveform on line 56 from control circuit 42, as depicted in FIG. 3(e), having a repetition rate the same as the pulse frequency of the pulses on output line 44 from controller 42. (Note that FIG. 3(a)–3(c) have a different time scale from FIGS. 3(d)–3(h).) Thus, when the processed signal voltage on line 48 is lower than the reference voltage on line 49 by an amount that exceeds the level of the sawtooth voltage on line 56, comparison circuit 54 provides an output on its output line 58, as depicted in FIG. 3(f). This output closes switch 60, which preferably is a solid state switch. The reference voltage on line 49 is selected so that switch 60 closes to provide exciter voltage to generator 14 whenever the peak voltage of the sawtooth waveform on line 56 is greater than the desired peak voltage of the generator 14 output.

The phase-winding voltage from permanent magnet generator 16 is applied by line 22 to a rectifying unit 62 within voltage regulator 24, and the resulting rectified voltage, depicted in FIG. 3(g), is provided to one contact of switch 60. The other contact of switch 60 is connected to output line 26 from voltage regulator 24 to exciter 18 within generator 14. Whenever comparison circuit 54 provides an output pulse, as depicted in FIG. 3(f), output line 26 provides a voltage pulse, as depicted in FIG. 3(h), to the field winding of exciter 18 within generator 14. Thus, the exciter voltage is controlled to control the output voltage from generator 14 so that the processed voltage on line 48 is substantially equal to the reference voltage on line 49. This maintains the output voltage from generator 14 at the desired level.

Because the pulses of FIG. 3(c), which are provided on line 44, are synchronized with the zero crossing voltage on line 40, the A/D sampling by converter 36 is synchronized with the generator 14 output voltage. This avoids sub-fundamental modulation of the output from A/D converter 36 to preprocessing circuit 46 and improves the accuracy of the voltage regulator. Consequently, a lower sampling rate might be satisfactorily utilized than would otherwise be the case, reducing the complexity and thus the cost of the voltage regulator.

Figure 4:
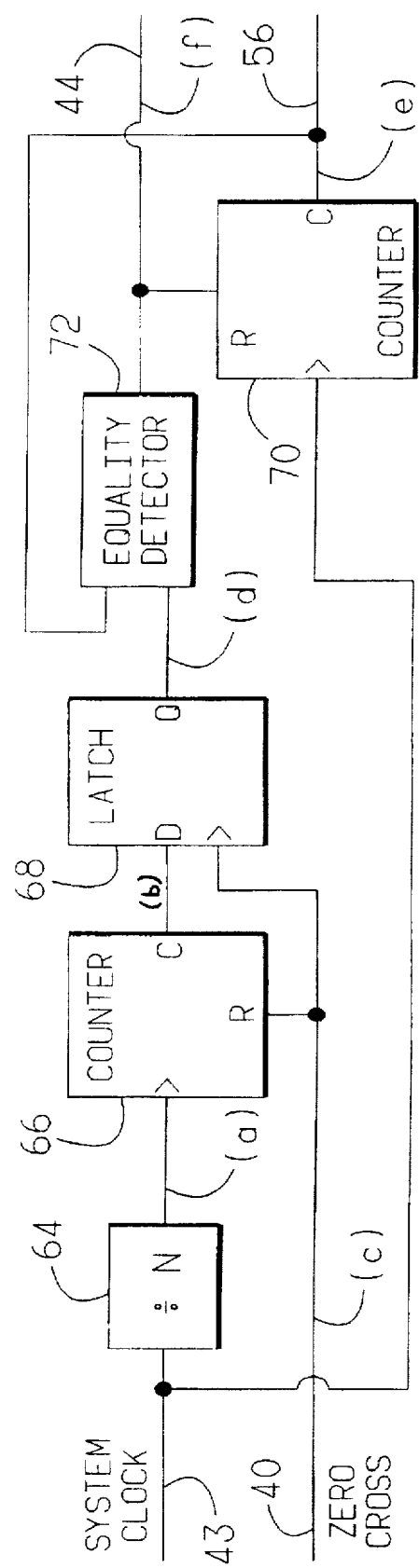
FIG. 4 is a block diagram of a first embodiment of a controller suitable for use in the voltage regulator of FIG. 2 in accordance with the present invention.

FIG. 4 depicts a frequency multiplier with a prescaler as a first embodiment of circuitry suitable for use as controller 42. The system clock signal on line 43, which might be any time base so long as it is significantly higher than the frequency of the output voltage from generator 14 and, for example, might be 12 MHz, is applied to divider circuit 64 which divides the frequency by a suitable factor N, for example 36. The output of divider circuit 64 is thus a sub-multiple of the clock frequency, as depicted in FIG. 5(a), and is applied to counter 66. The count output from counter 66, which is depicted in FIG. 5(b), is applied to the input of latch circuit 68. The zero cross signal on line 40, depicted in FIG. 5(c), is applied to the reset input of counter 66 and to the latch input of latch circuit 68. Thus, counter 66 counts the number of pulses from divider 64 that occur during each zero crossing cycle of the generator 14 output voltage, and that count value is latched in latch 68. The output of counter 66 is therefore a sawtooth voltage having a repetition rate determined by the zero cross signal on line 40, and thus by the output from main generator 20, and the latch 68 output is a level, as depicted in FIG. 5(d), which represents the peak value of the sawtooth. The sawtooth increments at a rate determined by the output of divider circuit 64.

The system clock signal on line 43 is also counted by counter 70, the output of which incrementally increases to provide the sawtooth waveform on line 56, as depicted in FIG. 5(e). The output from counter 70 is also applied to the first input of equality detector 72, the second input of which is connected to the output of latch 68. Thus, when the sawtooth voltage from counter 70 equals the count level latched in latch circuit 68, equality detector 72 provides an output. This output of equality detector 72 is connected to the reset input of counter 70, and so the equality detector 72 output is a brief pulse. The equality detector output is connected to output line 44 to provide the sampling pulses to A/D converter 36, as depicted in FIG. 5(f). The repetition rate of the sawtooth output of converter 70 is thus dependent upon the frequency of the output voltage from main generator 20, as well as the system clock rate and the factor N, while the sawtooth increments at the system clock rate.

FIG. 6 depicts a frequency multiplier with a divider as a second embodiment of circuitry suitable for use as controller 42. In this embodiment, the system clock signal on line 43 is counted by a counter 74 which is reset by the zero cross voltage on line 40. FIG. 5(a) illustrates such clock signals. (Note that due to divider 64, FIGS. 5(a) and 5(b) have a different time scale when they are considered in conjunction with the embodiment of FIG. 4 than they have when considered in conjunction with the embodiment of FIG. 6.) The zero cross pulse is depicted in FIG. 5(c). The count value of counter 66 incrementally increases, as depicted in FIG. 5(b), until it is latched in latch circuit 76 when the zero cross pulse occurs on line 40. The output of latch circuit 76 is shown by FIG. 5(d). Dividing circuit 78 divides this latch voltage, as a numerator, by a value on line 79 which is dependent upon the desired maximum desired level for the sawtooth voltage on line 56, as a denominator. The output of counter 74 is a sawtooth having a repetition rate equal to the frequency of the output from main generator 20 and an incrementing rate equal to the frequency of the system clock signal.

The system clock signal on line 43 is also counted by counter 70, the output of which provides the sawtooth waveform on line 56, as depicted in FIG. 5(e), and also provides the first input to equality detector 72. The output of dividing circuit 78 is connected to the second input of equality detector 72. When the incrementally increasing output of counter 70 equals the output of dividing circuit 78, equality detector 72 provides an output which resets counter 70 and provides the sampling pulses on line 44, as depicted in FIG. 5(f). The repetition rate of the sawtooth output of counter 70 is dependent upon the frequency of the output voltage from main generator 20, as well as the system clock rate and the denominator value applied to dividing circuit 78 by line 79. The sawtooth increments at the system clock rate.

Figure 5:
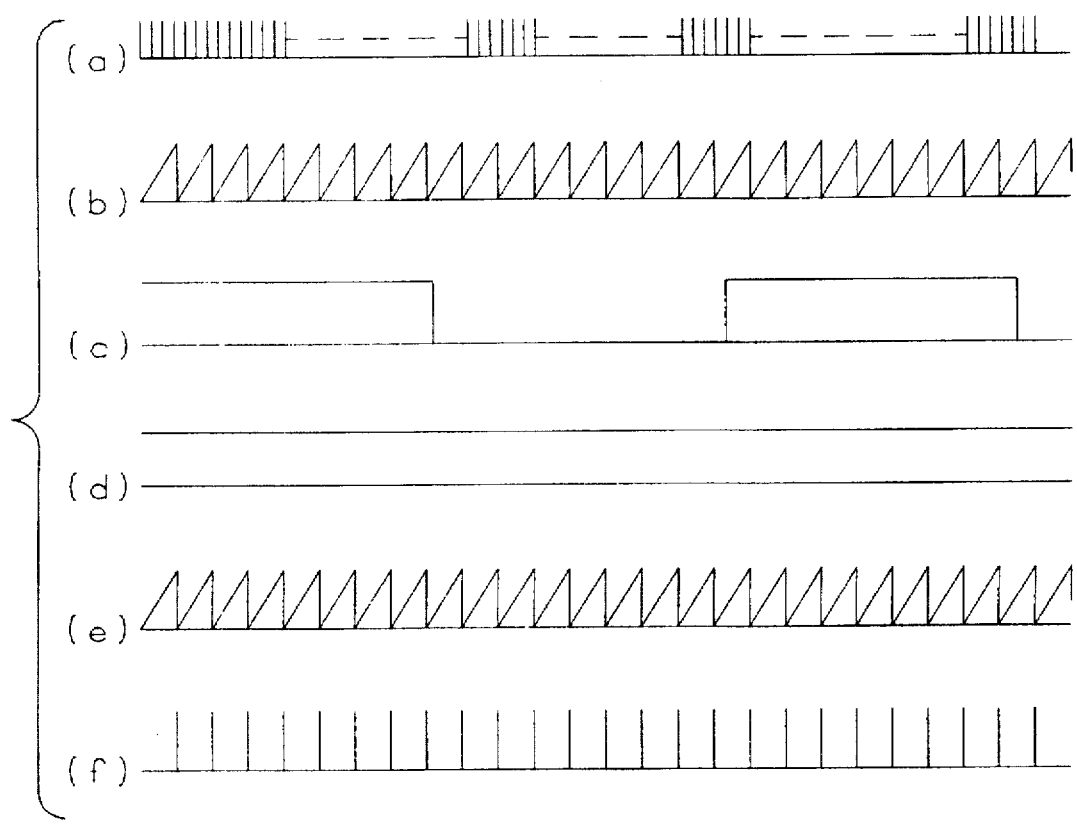
FIG. 5 depicts waveforms at various points in the block diagram of FIG. 4.

The waveforms of FIG. 5 are equally applicable to the embodiment of FIG. 6, although in connection with the embodiment of FIG. 6 the waveform of FIG. 5(a) depicts the system clock signal on line 43, whereas in connection with the embodiment of FIG. 4 the waveform of FIG. 5(a) depicts the output of dividing circuit 64. Therefore, in the embodiment of FIG. 6 the sawtooth output of counter 74, which is the waveform of FIG. 5(b), rises to a higher level than does the sawtooth the output of counter 66 in the embodiment of FIG. 4. Both of these sawtooth outputs are represented by FIG. 5(b). Consequently, the output of latch 76 is a higher level than the output of latch 68. This is compensated in the embodiment of FIG. 6 by divider 78, in place of divider 64 of the FIG. 4 embodiment, so that the input to equality detector 72 from dividing circuit 78 is substantially the same as the input to equality circuit 72 from latch 68.

In the embodiment of FIG. 7, the system clock signal on line 43 is counted by counter 74 which is reset by the zero cross pulses on line 40, and that counter output is latched by latch circuit 76 with each zero cross pulse. The waveforms of FIGS. 5(a)–5(d) apply to the embodiment of FIG. 7 just as they do to the embodiment of FIG. 6. Dividing circuit 80 utilizes as a numerator a reference value on line 81 which is dependent upon the desired maximum level of the ramp voltage on line 56 and utilizes the output of latching circuit 76 as the denominator. The output of dividing circuit 80 is provided to the first input of accumulator 82, the output of which is connected to latch 84. By way of example, accumulator 82 can be a 12 bit accumulator, while latch 84 is a 24 bit latch. The low order 12 bits of the latch 84 output are then returned to accumulator 82, while the high order 12 bits provide the sawtooth waveform of FIG. 5(e) on line 56. Latch 84 receives the system clock signal at its latching input and the zero cross pulse at its reset input. The output of latching circuit 84 thus incrementally increases to provide the sawtooth waveform on line 56. Since the high order bits of the latch output are applied to the second input of accumulator 82, the summation output from accumulator 82 incrementally increases until latching circuit 84 is reset. The accumulator carry output provides the A/D sampling pulse outputs on line 44, as depicted in FIG. 5(f). The sawtooth output on line 56 from accumulator 84 has a repetition rate equal to the frequency of the output voltage from main generator 20 and an incrementing rate equal to the system clock rate.

Figure 3:
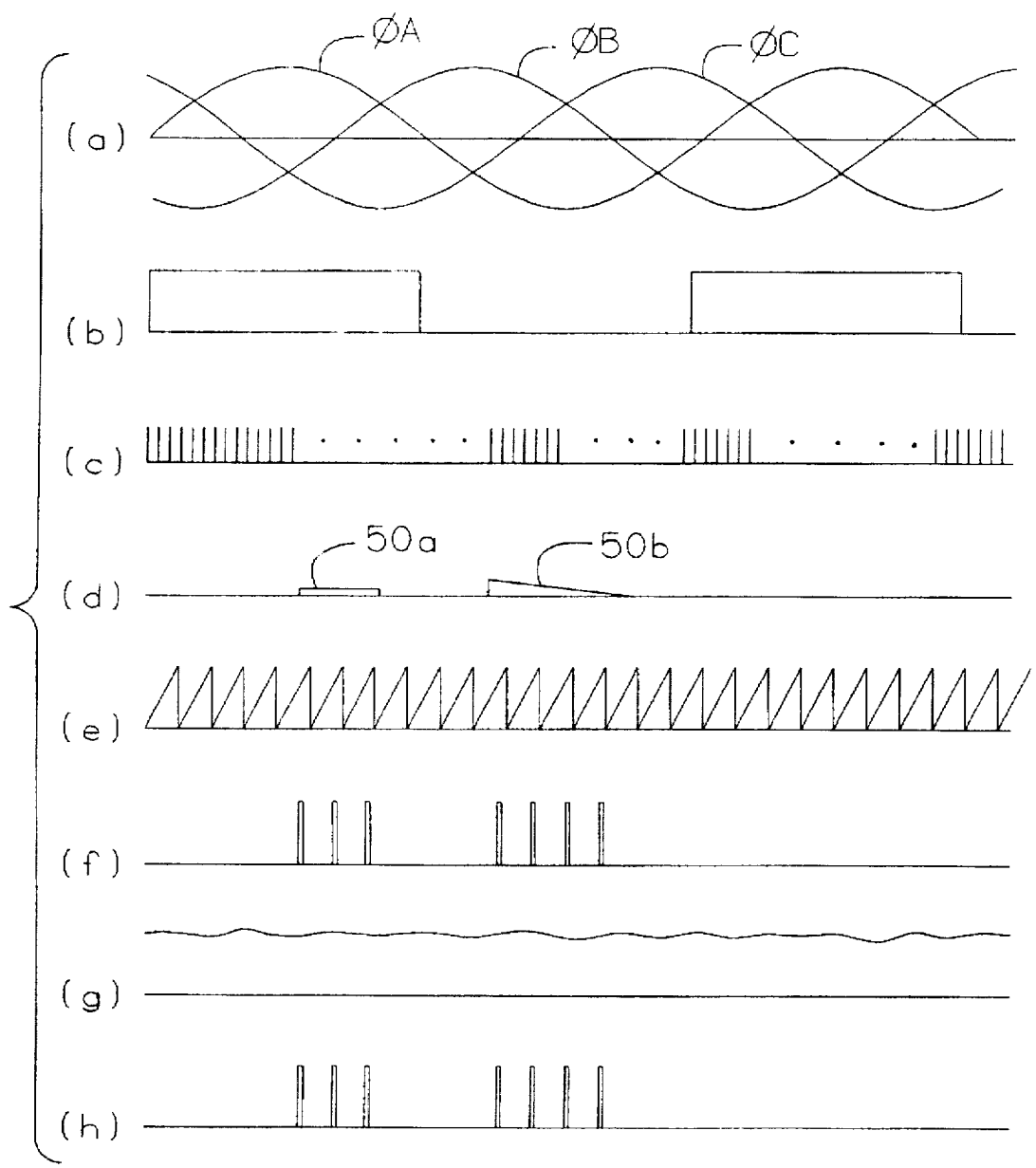
FIG. 3 depicts waveform at various points in the block diagram of FIG. 2.

For ease of explanation, FIGS. 3 and 5 illustrate operation of the present invention by depicting analog waveforms. However, controller 42 is a digital controller and might be implemented by a properly programmed microprocessor, and so the signals of FIGS. 3(d), 3(e), and 3(f) and of FIGS. 5(b), 5(d), and 5(e) are actually in digital form within the circuitry.

In a typical application of the present invention in controlling voltage from an aircraft auxiliary power unit, generator 14 provides three phase voltage at a frequency $F_1$ of 400 Hz, a system clock having a frequency $F_c$ of 12 MHz is utilized, and dividing circuit 64 has a scaling factor N of 36. The output pulses on line 44 and the sawtooth waveform line 56 have a repetition rate of $(N \times F_1)$, or 14.4 KHz. The digital circuitry of counter 66 results in the counter output incrementally increasing with an increment interval of $N \div F_c = 36 \div 12$ MHz=3 µs.

In the above description, the pulses on line 44, which cause A/D converter 36 to sample the generator 14 output voltage on line 30, are described as "synchronous" with that output voltage. The repetition rate of the pulses on line 44 is greater than the frequency of the generator 14 output voltage, and by "synchronous" is meant that one of the pulses on line 44 is initiated as the output voltage on line 30 is changing from a negative value to a positive value. Since the sawtooth voltage on line 56 is reset when the line 44 pulses are initiated, and since A/D converter 36 samples the generator 14 output voltage when the line 44 pulses occur, it follows that the generator 14 output, the A/D sampling, the line 44 pulses, and the sawtooth voltage on line 56 are all synchronous.

Although the present invention has been described with reference to preferred embodiments, rearrangements and substitutions could be made, and still the result would be within the scope of the invention.

We claim:

1. A voltage regulator for an electrical power system including a permanent magnet generator (PMG) having at least one armature winding for generating a PMG voltage, an exciter having an exciter field winding, and a main generator for providing a main generator output voltage, said voltage regulator comprising:

a clock signal source for providing a system clock signal;

a controller for multiplying the frequency of the main generator output voltage by a predetermined value to provide a sampling signal having the multiplied frequency and synchronized with the main generator output voltage, and for providing a first sawtooth voltage signal having a repetition rate equal to the frequency of the sampling signal and synchronized with the main generator output voltage and having an incrementing rate dependent upon the system clock signal;

a reference voltage source for providing a reference voltage;

means for sampling the main generator output voltage at the frequency of the sampling signal and providing a representation of the sampled voltage; a first comparator for providing a difference signal when the reference voltage is greater than the representation of the sampled voltage;

a second comparator for providing a switching signal when the difference signal is greater than the first sawtooth voltage signal;

means responsive to the switching signal for switching the PMG voltage; and means for providing the switched PMG voltage to the exciter field winding.

2. A voltage regulator as claimed in claim 1, wherein said controller comprises:

first means for generating the first sawtooth voltage with an incrementing rate equal to the system clock rate;

second means for generating a second sawtooth voltage with a repetition rate equal to the main generator output voltage and an incrementing rate determined by the system clock signal; third means responsive to the first sawtooth voltage equaling the second sawtooth voltage for providing the sampling signal and resetting said first means.

3. A voltage regulator as claimed in claim 2, wherein said first means comprises a first counter for counting the clock signal, and means responsive to the first sawtooth voltage equaling the second sawtooth voltage for resetting said first counter.

4. A voltage regulator as claimed in claim 3, wherein said second means comprises means for dividing the clock signal frequency by a predetermined factor to provide a divided clock signal, a second counter for counting the divided clock signal, and means responsive to the main generator output voltage changing from a negative value to a positive value for resetting said second counter.

5. A voltage regulator as claimed in claim 2, wherein said second means comprises means for dividing the clock signal frequency by a predetermined factor to provide a divided clock signal, a first counter for counting the divided clock signal, and means responsive to the main generator output voltage changing from a negative value to a positive value for resetting said first counter.

6. A voltage regulator as claimed in claim 5, wherein said third means comprises means responsive to the main generator output voltage changing from a negative value to a positive value for latching the value of the divided clock signal, and means for comparing the latched value with the first sawtooth voltage.

7. A voltage regulator as claimed in claim 1, wherein said controller comprises: first means for generating the first sawtooth voltage with an incrementing rate equal to the system clock rate;

second means for generating a second sawtooth voltage having a repetition rate equal to the main generator output voltage and an incrementing rate equal to the system clock signal rate;

third means for latching the peak value of each repetition of the second sawtooth voltage to provide a latched peak value signal;

fourth means for dividing the latched peak value signal by a preset value to provide a divided value signal;

fifth means responsive to the first sawtooth voltage equaling the divided value signal for providing the sampling signal and resetting said first means so as to determine the repetition rate of the first sawtooth voltage.

8. A voltage regulator as claimed in claim 7, wherein said first means comprises a first counter for counting the clock signal, and means responsive to the first sawtooth voltage equaling the second sawtooth voltage for resetting said first counter.

9. A voltage regulator as claimed in claim 8, wherein said second means comprises a second counter for counting the clock signal to provide a count signal, and means responsive to the main generator output voltage changing from a negative value to a positive value for resetting said second counter; and wherein said third means comprises a latch circuit responsive to the main generator output voltage changing from a negative value to a positive value for latching the count signal to provide a latched signal.

10. A voltage regulator as claimed in claim 1, wherein said controller comprises: first means for generating a second sawtooth voltage having a repetition rate equal to the main generator output voltage and an incrementing rate equal to the system clock signal rate;

second means for latching the peak value of each repetition of the second sawtooth voltage to provide a latched peak value signal;

third means for dividing a preset value by the latched peak value to provide a divided value signal;

fourth means for adding the divided value to a latched value signal to provide an accumulated value signal;

fifth means responsive to the system clock signal for latching the accumulated value signal to provide the latched value signal;

sixth means for providing the latched value signal as the first sawtooth voltage signal; and seventh means responsive to the accumulated value signal reaching a predetermined level for providing the sampling signal.

11. A voltage regulator as claimed in claim 10, wherein said first means comprises a first counter for counting the clock signal to provide a count signal, and means responsive to the main generator output voltage changing from a negative value to a positive value for resetting said first counter; and wherein said second means comprises a latch circuit responsive to the main generator output voltage changing from a negative value to a positive value for latching the count signal to provide a latched signal.

12. A voltage generator as claimed in claim 1, wherein said controller, said sampling means, and said first and second comparators operate digitally in response to the clock signal.

13. A voltage regulator for an electrical power system including a permanent magnet generator (PMG) having at least one armature winding for generating a PMG voltage, an exciter having an exciter field winding, and a main generator for providing a main generator output voltage, said voltage regulator comprising:

a reference voltage source for providing a reference voltage;

a processing circuit for providing a processed signal voltage indicative of a representative value of the main generator output voltage;

a controller for providing a sawtooth voltage signal having a sawtooth frequency that is an integral multiple of the frequency of the main generator output voltage;

first means for providing a difference signal when the reference voltage is greater than the processed signal voltage;

second means for providing a switching signal when the difference signal is greater than the sawtooth voltage signal;

third means responsive to the switching signal for switching the PMG voltage; and fourth means for providing the switched PMG voltage to the exciter field winding.

14. A voltage regulator as claimed in claim 13, wherein, said processing circuit comprises means for sampling the main generator output voltage at a sampling interval that is an integral multiple of the frequency of the main generator output voltage to provide a sampled voltage signal, and means for providing a digital representation of the sampled voltage signal as the processed signal.

15. A voltage regulator as claimed in claim 13, wherein said controller comprises a clock signal source, a counter for counting clock signals from said clock signal source to provide the sawtooth voltage, and means responsive to the switching signal for resetting said counter.

16. A voltage generator as claimed in claim 13, wherein said processing circuit, said controller, said first means, and said second means operate digitally in response to the clock signal.

* * * * *